K. SCHWAB.
Mill-Stone Dresses.

No. 149,346.          Patented April 7, 1874.

Witnesses:
Chas. Meisner
J. W. Berthel

Inventor:
Kilian Schwab
per Herthel & Co
attys.

UNITED STATES PATENT OFFICE.

KILIAN SCHWAB, OF LEBANON, ILLINOIS.

IMPROVEMENT IN MILLSTONE-DRESS.

Specification forming part of Letters Patent No. 149,346, dated April 7, 1874; application filed January 10, 1874.

*To all whom it may concern:*

Be it known that I, KILIAN SCHWAB, of Lebanon, in the county of St. Clair and State of Illinois, have invented an Improved Millstone-Dress, of which the following is a specification:

The following are the peculiar features of my improved dress: Forming the furrows and lands of both stones—leading and runner—in two series—an inner and outer series—or which I determine the eye and periphery series. The eye series of the leading stone has its leading furrows partitioned at a greater angle from the eye-center than the furrows composing its periphery series, the smallest furrow of said eye series running in straight line with the center of its stone. The eye series of the running stone are such that its smallest furrows are positioned the greatest angle from the center of the eye, those composing its periphery series being less. The dress for a pair of stones is, therefore, such that the furrows and lands of the periphery series of the runner are dressed to an angle of twice the dimensions of the dress of the corresponding series composing the leader, and the outer furrows of the eye series of the leader form half as small an angle as that made in dressing the corresponding outer eye series composing those of the runner.

Figure 1:
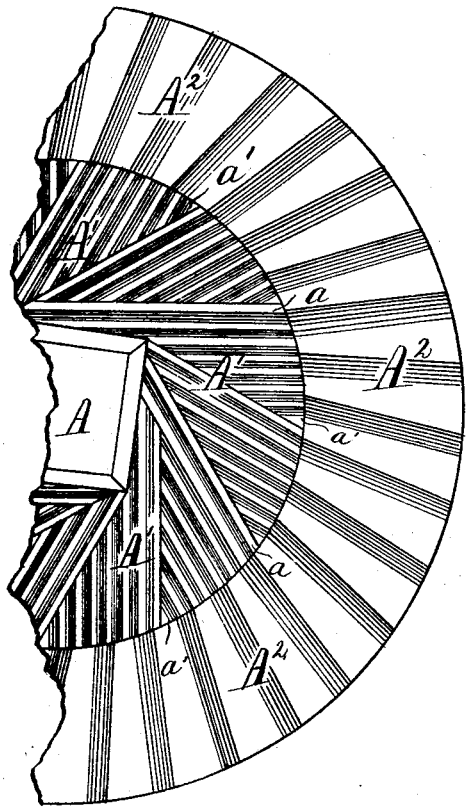
Figure 2:
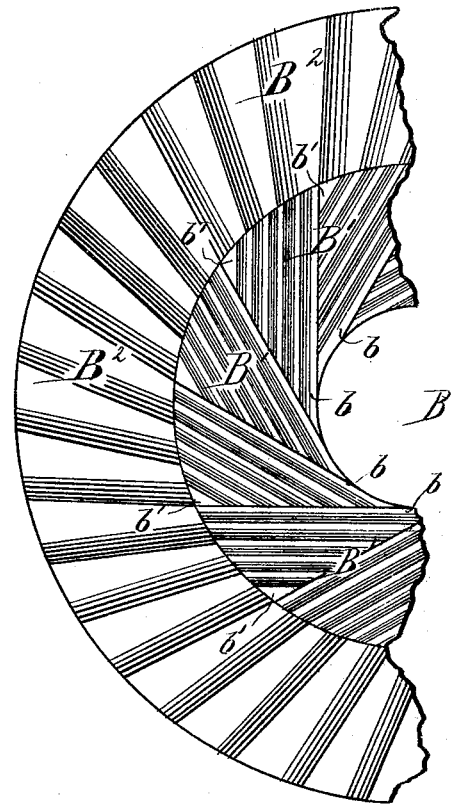
Figure 3:
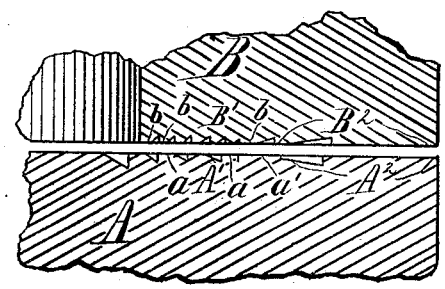

Of the drawing, Figure 1 is a part-plan view of the leading stone, having my improved dress; Fig. 2, part-plan view of the runner stone inverted, showing its form of the furrows, Fig. 3 being a part vertical section of a pair of millstones according to my dress.

A is the bed-stone. The bed-stone A I provide with inner and outer series of furrows and lands. Hence $A^1$ is the eye series and $A^2$ the periphery series. In the eye series, $a$ represents the leading furrows and lands, with auxiliaries running parallel with $a$, and terminating with the smallest or inner furrow $a'$. As shown in Fig. 1, the small furrows $a'$ are in straight line with the center of the eye of the stone, while the leading furrows $a$ are positioned at an angle diverging tangentially from the circumference of the eye of said stone. Both the furrows and lands $a$, as well as all auxiliary furrows and lands composing the eye series of the stone A, are of the same width and depth. From the circumference of the eye series $A^1$ of the stone A to the periphery of said stone proper I provide lands and furrows composing the periphery series $A^2$. The dress of the series $A^2$, however, is such as to be of less angle than the leading furrows $a$ of the eye series.

For practical purposes the scale of dressing the leading stone per my method can be stated to be, viz: Dress the periphery series of furrows and lands $A^2$ so that the outer edge produced by each furrow, taken on a straight line with that through the center of the eye shall be (4) four inches from said center to the point of intersection. Dress the leading furrows $a$ of the eye series of the stone A so that the point of intersection shall be (6) inches from the center.

B is the runner. This I similarly provide, like the leader A, with the eye and periphery series of furrows and lands. Hence, $B^1$ is the eye series, and $B^2$ its periphery series. In the eye series of the runner, $b$ represents the leading furrows and lands, its auxiliary furrows and lands running parallel with $b$, and terminating in the smaller or outer furrows $b'$. As shown in Fig. 2, the dress of the furrows and lands $b\ b'$ is reversed, that of $b$ being the inner, and $b'$ being the outer, from point or center, the furrows $b$ being dressed to diverge tangentially from the circumference of the eye, while those of $b'$, being the outer, describe the greatest angle from center of stone. Also, from the circumference described by the eye series $B^1$ to the periphery of the stone proper, I provide furrows and lands composing the periphery series $B^2$, the dress of the periphery series $B^2$ being, however, such as to be of less angle than the smallest or outer furrows $b'$ of the eye series $B^1$. Therefore, for practical purposes, the dress of the runner B can be stated to be: Dress the periphery series of furrows and lands $B^2$ so that the edge produced by each furrow, taken on a straight line with that through the center of the stone, shall be eight (8) inches from said center to point of intersection; dress the outside, or furrows $b'$ of the eye series, so that the point of intersection shall be twelve (12) inches. All the furrows in the stone B should be dressed with slightly more depth than the dress of the stone A.

The pair of stones thus dressed, when operated, the grinding action of the flour will take place as near to the eye of the stones as possible, this being the object of my forming both eye series $A^1$ and $B^1$ in each stone, and thereby saving the power required for driving the runner.

The variation of dress above described between the furrows and lands composing the eye series of the leader and those composing the eye series of the runner, achieve the advantageous action of gradually retaining the flour and meal, as it approaches the dress, at their peripheries.

The variations of dress noticeable between the periphery series give the advantages, viz: When the flour and meal is between said periphery furrows and lands, the final action, to impart evenness of particles, takes place, and is insured, and the flour is delivered in a more perfect fineness. Finally, my improved dress prevents the stones from injuring the color of the flour by becoming overheated; and, in general, a gain in quality of its products is the result, as well as in the quantity thereof.

What I claim is—

1. In a millstone having a dress series at the eye and periphery, as described, the radial groups of furrows and lands of the eye dress, the members of the group being parallel to each other, as described, and the radial furrows and lands of the periphery series, arranged as described, for the purpose set forth.

2. The combination of the bed-stone A and runner B, having the series of dress described cut at different angles, as and for the purpose set forth.

In testimony of said invention I have hereunto set my hand.

KILIAN SCHWAB.

Witnesses:
SEVERIN E. MOTT,
CHRISTIAN MÜLLER.